June 16, 1964 W. A. BEDFORD, JR 3,137,048
MOLDING CLIPS
Filed Oct. 3, 1961 2 Sheets-Sheet 2

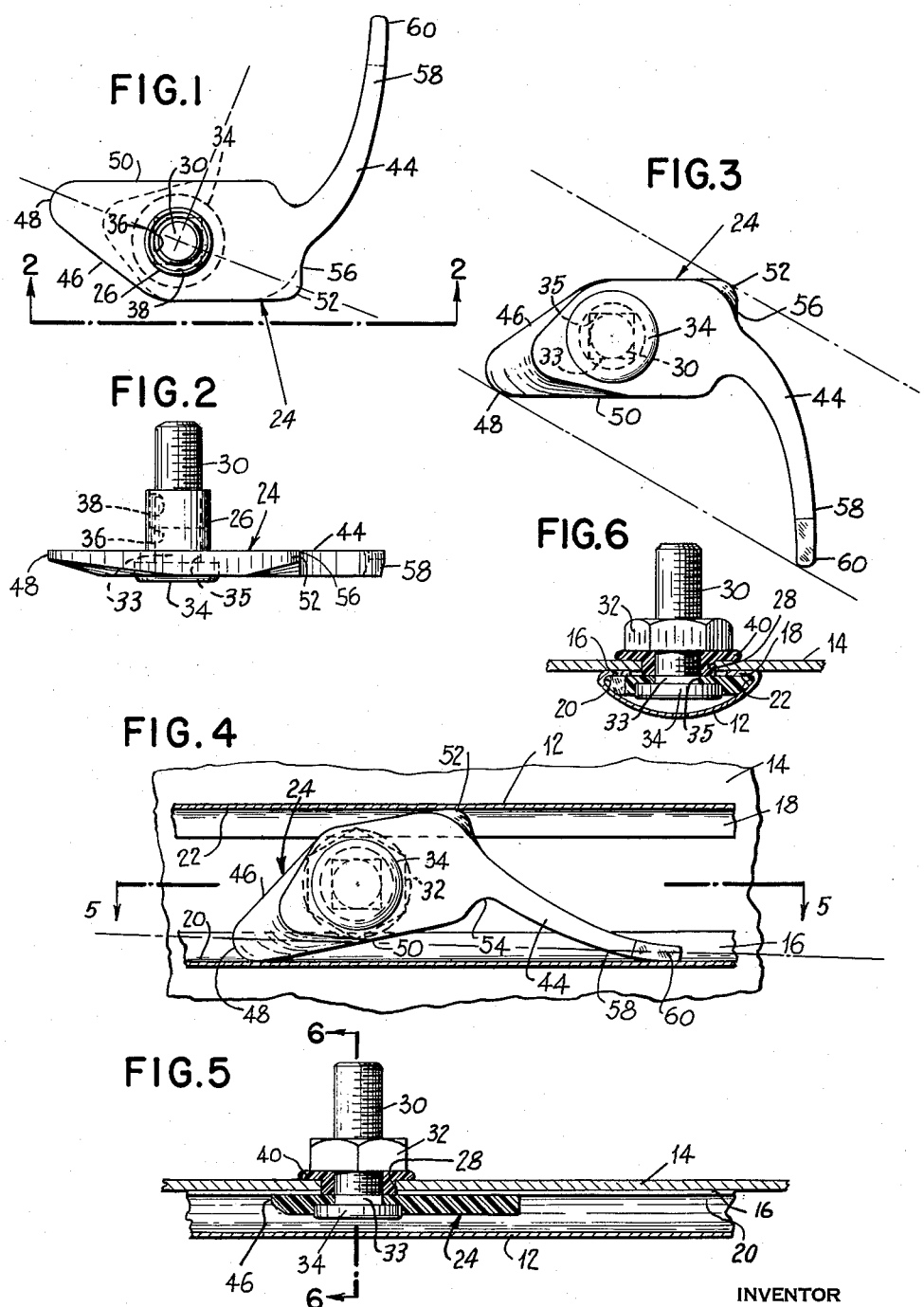

INVENTOR
WILLIAM A. BEDFORD, JR.
BY
ATTORNEY

United States Patent Office 3,137,048
Patented June 16, 1964

3,137,048
MOLDING CLIPS
William A. Bedford, Jr., Littleton, Colo., assignor, by mesne assignments, to Thompson Bremer & Company, Chicago, Ill., a corporation of Delaware
Filed Oct. 3, 1961, Ser. No. 142,710
7 Claims. (Cl. 24—73)

This invention relates to fastening devices and in particular to a fastener for attaching molding strips or the like to a panel structure.

Various types of T-bolt fasteners are known in the automotive and appliance industries to secure hollow channeled trim strips to apertured body walls and panels. Such fasteners are readily mounted in a desired position by inserting the head, or molding engaging portion, of the fastener behind the inwardly spaced flanges of the trim strip and securing the stud or panel engaging portion, of the fastener in the aperture. Those devices which have been commonly used have had the disadvantage of not being adaptable for more than a few of the wide variety of sizes and taper of molding strips and of being constructed of material which is not resistant to corrosion, rust or moisture seepage through the aperture.

It is the object of the present invention to provide a molding clip or fastener device which overcomes the disadvantages of the known devices and which is simple and economical to manufacture and use. These and other advantages and objects will become apparent in the following description and from the accompanying drawings in which:

FIG. 1 is a top plan view of the device of the present invention;

FIG. 2 is a side elevation view of the device as seen along lines 2—2 of FIG. 1;

FIG. 3 is a bottom plan view of the device;

FIG. 4 is a view of the device in position holding a molding strip to a panel structure with the molding strip shown in longitudinal section;

FIG. 5 is a partially sectioned side elevation taken along lines 5—5 of FIG. 4;

FIG. 6 is a partially sectioned end elevation taken along lines 6—6 of FIG. 5, and;

Figure 7:
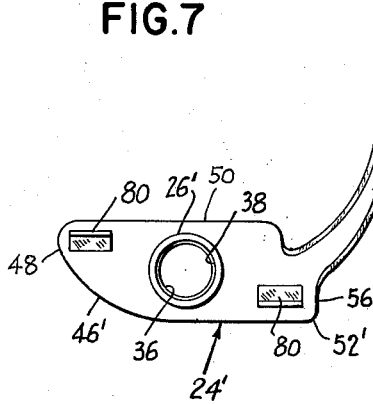
FIGS. 7–12 are modified forms of the present invention showing views similar to those of the preceding figures.
Figure 8:
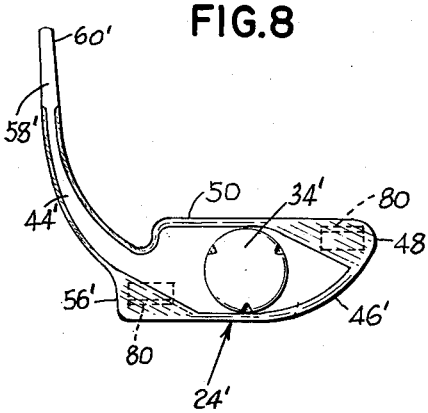
Figure 9:
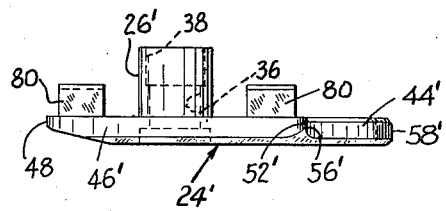
Figure 10:
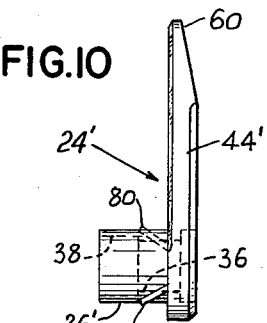

In FIGS. 1–6 of the drawings, there is illustrated a molding clip or fastener made of molded plastic and adapted for assembly with a molding strip 12 to enable the molding strip to be attached to a supporting panel 14. The type of molding with which the fastener is best adapted for use is generally channel-shaped with inturned edges or flanges 16 and 18 forming recesses 20 and 22 at opposite sides.

The fastener comprises a molding-engaging portion or body 24 and a panel engaging portion or stud 26 for insertion in an aperture or opening 28 in the panel 14. A longitudinal bore is provided through the stud 26 and body 24 for the reception of a bolt 30 engaging a nut 32 exteriorly thereof, the bolt having a round head 34 countersunk in the body 24. Means are provided to prevent the bolt 30 from rotating in the fastener by providing a short shank portion 33 of the bolt with a polygonal shape and seating it in a correspondingly shaped bore 35 formed in the body 24, or, as illustrated in FIGS. 7–12, by comprising the staking or mashing of a round headed bolt to cut into and grasp the bottom of a complementary recess in the fastener body for receiving the bolt head.

The stud portion 26 is a substantially hollow tubular body of plastic material adapted to receive the bolt 30. The stud is formed with a thick wall section 36 adjacent the fastener body 24 and a thin wall section 38 at the outer end. As shown in FIGS. 1–6, the stud 26 may be separable from the body 24 or, as in FIGS. 7–12, it may be integral with the fastener body. In securing the fastener, the nut 32 is tightened against the extreme end of the stud 26 forcing the molding strip 12 tightly up against the panel 14. During this time the thin wall portion 38 of the stud 26 bows outwardly forming a bead or flange 40 which, after the nut 32 is fully tightened, provides a complete insulating layer of plastic between the nut 32 and the panel 14 while the stud wall section 36 insulates the bolt 30 from the panel 14.

The stud 26, in structure and function, is one of the general type described and claimed in my copending application, Serial Number 142,709 filed on even date herewith. In my copending application, various forms of studs 26 are shown, all of which may be satisfactorily adapted for use with a molding-engaging portion described herein, to provide for a non-corrosive, rust-resistant and moisture sealing fastener. It will be understood, however, that the present invention, which is directed primarily to the molding-engaging portion or body 24 and integral arm 44, may employ other types of studs, bolts, clips or fasteners than that disclosed herein and in my copending application. The arm 44 is substantially rectangular in transverse cross section over its entire length, as is evident from FIGS. 1–4, considered together.

The novel molding-engaging portion or head 24 is of a flat polygonal shape having an integral resilient arm 44. The head 24 has a length greater than the width of the molding 12 and a width less than or equal to the distance between the inner walls of the molding recesses 20 and 22. It is substantially a trapezoid having rounded corners and a side 46 opposite the extending arm 44 elongated to form an acute angle with the lower adjacent side 50 at a bearing corner 48. A diagonally opposite, rounded, bearing corner 52 may more closely approximate a right angle as shown. Both corners 48 and 52 are beveled to a reduced thickness (FIGS. 2–4) to permit them to lodge in and bear upon the inner surfaces of the molding recesses 20 and 22.

The resilient arm 44 extends from a side 56 of the body in a sweeping curve and lies entirely within the plane of the body 42. The arm flares in width to merge gradually into the side 56 of the body and extends outwardly to a generally straight portion 58 substantially normal to a longitudinal or major axis of the body shown passing through the bearing corners 48 and 52. The tip 60 of the arm is beveled in thickness to permit it to enter and bear upon the inner surface of the recess 20 or 22 of the molding strip.

In operation, the body 24 of the fastener is inserted into the molding strip beneath the inturned flanges 16 and 18. The resilient arm 44 is then snapped over the edge of one of the flanges so that the tip 60 enters into one of the recesses 20 or 22. As this is done, the body 42 tends to rotate about the axis of the bolt 30, wedging the corners 48 and 52, respectively, into the recesses 20 and 22, and transforming the fastener into a stressed strut or brace across the molding strip. The arm 44 insures the continuous application of a spring force acting on the body 24 so that it does not become dislodged even after prolonged use or vibration. As will be apparent from a comparison of FIGS. 3 and 4, this is done by bending the arm 44 against its initial curvature and through and beyond a straightened condition until its curvature is appreciably reversed and the free end or tip portion 60 of the arm is directed substantially parallel to the molding recesses and away from the more remote bearing corner 48 along a straight line substantially passing therethrough (FIG. 4). During such bending, the arm 44, of course, remains coplanar with the body 24 so that the force which it exerts on the body is essentially a torque about the bolt 30 that is counterclockwise as the assembly is viewed in FIG. 4 and holds the arm tip 60 and bearing corners 48 and 52 tightly against the engaged inner side surfaces of the molding recesses 20 and 22.

Figure 11:
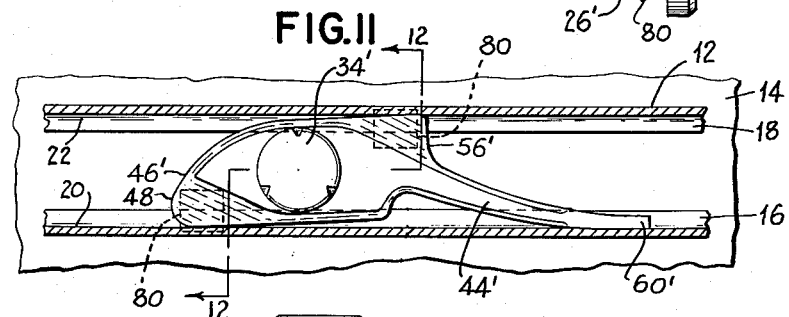
Figure 12:
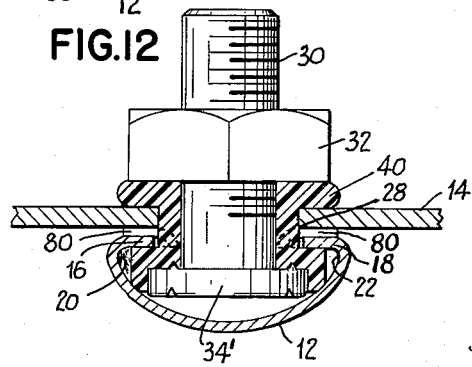

It will be apparent that a single size fastener may be employed in various widths or taper of molding strip. The width of such strips ranging in size between the minimal distance defined by the upper and lower parallel sides of the body 42 (substantially as shown in FIG. 11) to the maximum distance defined by a line running through the extreme edge of corner 48 and tip 60 and a line parallel thereto running through the extreme edge of corner 52 (substantially as shown by the dot-dash lines in FIG. 3).

The molding-engaging portion or body 24 of the fastener is preferably made of a plastic such as nylon or "Teflon" (tetrafluoroethylene resin). It is because of the toughness and rigidity obtainable in these plastics that the particular configurations of the body portion 24 and integrally formed arm 44 can withstand the forces and flexure to which they are subjected while providing the required resilient, spring-like stiffness.

In FIGS. 7–12, the fastener is shown as including an arm 44' and a stud 26', both integrally formed on a body 24' so as to produce a unitary part otherwise generally corresponding to the above described two-piece fastener unit of FIGS. 1–6. These integrally molded parts 44', 26', and 24' individually include structural details closely conforming in shape and function to the corresponding details of the two-piece unit of FIGS. 1–6, the correspondents being substantially exact as indicated by the use of identical reference characters, and differing only slightly in shape to accommodate a molding strip 12' of slightly different dimensional proportions as indicated by the use of primes after the same reference character digits used in FIGS. 1–6. Except for the slight chamfering of the longitudinal edges of the arm 44' to modify its elastic resistance to bending, and except for the different means for preventing relative rotation of the bolt 30 and body 24' (mentioned above), the unitary fastener of FIGS. 7–12 otherwise differs from the two-piece fastener of FIGS. 1–6 only by providing a pair of tabs 80, preferably molded integrally with the body 24' and located on the inner face thereof (i.e., the face to be directed toward the mounting panel 14). The tabs 80 are respectively secured adjacent the bearing corners 52 and 48, spaced but a small distance from the edges of the body. In normal position, the tabs extend toward the edges of the body 24' and at an acute angle to the plane of the inner face of the body.

When the fastener is inserted into the molding strip 12, the tabs 80 remain extended outwardly, somewhat overlying the molding strip flanges 16 and 18 respectively. As the fastener is secured to the panel 14, however, the tabs 80 flex or bend around the flanges 16 and 18 and become lodged between the respective flanges and the panel 14. Upon fully tightening the fastener nuts 32, as in FIG. 12, it will be observed that the tabs form an insulating separation of the two flanges from the panel. The addition of the tabs 80 insures the separation of the molding strip from the panel so as to prevent any galvanic corrosion that might otherwise occur from contact between these metal parts, particularly should the panel opening be formed with burrs, chipped edges, or other faults which are common in mass production and may cause metal-to-metal contact despite painting of the panel 14.

It is thus obvious that the present invention may take more than one specific form while, nevertheless, retaining the essential structure and operation described above. Numerous advantages are found in the novel construction of the present invention, amongst which:

(1) The molding clip is made of a single unitary construction and may be molded in mass production, simply and economically;

(2) The resilient arm and its terminal bearing portion are all within the same plane as is the body portion, providing in operation at least three bearing surfaces all co-planar, thus avoiding any undue twist during assembly or in operation;

(3) The molding clip may be used with any type of stud fastener, although it is particularly adaptable to be used in combination with a self-sealing and insulating stud, as disclosed, to form a vibration proof, rust resistant, anti-corrosion clip;

(4) The molding clip may be used in a single size for a variety of widths and taper of molding strip, being easily assembled to the molding strip without the aid of any tools.

Since other obvious modifications may be made in this device without departing from the scope of the invention illustrated herein, reference is to be had to the appended claims to indicate those principles of the invention which are desired to be secured by Letters Patent.

I claim:

1. A one piece, molded plastic clip for use in combination with a mounting stud to attach an inwardly flanged, channel shaped molding to a panel, said clip comprising a thin, substantially flat body having opposed, rounded, bearing corners at opposite ends of a major transverse axis of the body, a stud-receiving opening through the body substantially midway between said bearing corners, and a substantially flat, resilient arm integrally extending outwardly in coplanar relationship with the body from an adjacent one of said bearing corners while curving toward a straight line passing through said opening and normal to said major axis, said arm being bendable while remaining coplanar with said body to straighten and appreciably reverse the curvature of the arm when the clip is in the molding with said bearing corners engaging opposite sides of the molding and with the free end of the arm bearing against the side of the molding opposite the side that is engaged by said adjacent bearing corner for holding the clip so positioned in the molding with said opening substantially centered between said sides thereof.

2. A fastener for attaching an inwardly flanged, channel-shaped molding to a side of a panel, comprising: a one-piece, molded plastic clip having a thin, substantially flat and relatively rigid body and an integrally formed, substantially flat arm that is coplanar with said body, said body having its greatest transverse dimension along a straight line through opposite, rounded, corner portions thereof and having a bolt-receiving opening therethrough substantially midway between said corner portions, said arm merging into said body adjacent one of said corner portions and to one side thereof and extending outwardly from the body in a direction generally transverse to said straight line, and said arm being of generally rectangular transverse cross section over its entire length and decreasing gradually in width from said body toward a free end of the arm to permit bending of the arm to swing the free end portion thereof in a direction toward parallelism with said straight line while remaining coplanar with the body; a headed, metal bolt having a shank passing through and beyond said opening in the body to pass a threaded end portion of the bolt through and beyond an aperture in said panel, the end of the bolt that passes through and beyond the aperture in the panel being shaped to receive and hold a threaded nut disposed on the opposite side of the panel from the clip and adapted to be tightened to pull the clip and associated molding toward said panel; and a plastic sleeve surrounding the shank of the bolt from the plastic clip body toward but short of the nut receiving end of the shank for passing through and beyond said panel aperture so as to insulate the bolt from contact with the panel, said sleeve being capable of plastic flow under pressure between the bolt head and nut as the nut is threaded onto and along the bolt until a portion of the sleeve has been flattened against one side of said panel by pressure from the nut to maintain the nut spaced from the panel when the nut has been tightened on the bolt to draw the clip and associated molding assembly firmly against the panel.

3. A fastener according to claim 2 in which said sleeve is an integral part with the clip body.

4. A fastener according to claim 2 in which said sleeve is a separate part from said clip body.

5. A one piece, molded plastic clip for use in combination with a mounting stud to attach an inwardly flanged, channel shaped molding to a panel, said clip comprising a thin, substantially flat, and relatively rigid body and an integrally formed, substantially flat arm that is coplanar with said body, said body having its greatest transverse dimension along a straight line through opposite, rounded corner portions, said arm merging into said body adjacent one of said corner portions and to one side thereof and extending outwardly from the body in a direction generally transverse to said straight line while curving toward another straight line normal to and bisecting the portion of said line through said corner portions, and said arm being of generally rectangular transverse cross section over its entire length to a free end thereof and having a small enough width over at least the curved portion of its length to permit bending of the arm through and beyond a substantially straightened condition until the curve in the arm is appreciably reversed and the free end portion of the arm has been directed away from the other one of said corner portions of the body and along a straight line substantially passing through said other one of said corner portions of the body.

6. A clip according to claim 5 in which said arm progressively decreases in width from its juncture with said body toward the free end of the arm, and a free end portion of the arm of substantial length progressively decreases in thickness to a minimum at said free end.

7. A fastener for attaching an inwardly flanged channel shaped molding to a side of a panel, comprising a molded plastic clip having a thin, substantially flat body shaped to provide opposed, rounded, bearing corners at opposite ends of a major transverse axis of the body and having a bolt receiving aperture through the body between said corners, said clip including a substantially flat, resilient arm integrally extending outwardly in coplanar relationship with the body from adjacent one of said bearing corners thereof, said arm curving toward a straight line normal to and bisecting said major transverse axis between said corner portions and being bendable while remaining coplanar with said body to straighten and appreciably reverse the curvature of the arm when engaging an inner side of the molding to hold the clip therein with said bearing corners engaging opposite sides of the molding; a headed, metal bolt having a shank passing through and beyond said body to pass a threaded end portion of the bolt through and beyond an aperture in said panel, the end of the bolt that passes through and beyond the aperture in the panel being shaped to receive and hold a threaded nut disposed on the opposite side of the panel from the clip and adapted to be tightened to pull the fastener and associated molding toward the panel; and a plastic sleeve surrounding the shank of the bolt from the plastic clip body toward but short of the nut receiving end of the shank for passing through and beyond said panel aperture so as to insulate the bolt from contact with the panel, said sleeve being capable of plastic flow under pressure between the bolt head and nut as the nut is threaded onto and along the bolt until a portion of the sleeve has been flattened against one side of said panel by pressure from the nut to maintain the nut spaced from the panel when the nut has been tightened on the bolt to draw the clip and associated molding assembly firmly against the panel.

References Cited in the file of this patent
UNITED STATES PATENTS

| | | |
|---|---|---|
| 2,643,433 | Scott | June 30, 1953 |
| 2,788,100 | Landell | Apr. 9, 1957 |
| 2,796,647 | Bedford | June 25, 1957 |
| 2,852,828 | Hamman | Sept. 23, 1958 |
| 3,000,066 | Cochran | Sept. 19, 1961 |
| 3,011,234 | Fiddler | Dec. 5, 1961 |
| 3,018,530 | Pender | Jan. 30, 1962 |
| 3,110,069 | Jones | Nov. 12, 1963 |

OTHER REFERENCES

| | | |
|---|---|---|
| 788,742 | Great Britain | Jan. 8, 1958 |